United States Patent Office 2,702,303
Patented Feb. 15, 1955

2,702,303

PREPARATION OF DICHLORACETALDEHYDE AND CHLORAL

Julian A. Otto, Long Island City, and Benjamin Veldhuis, Bayside, N. Y., assignors to Allied Chemical & Dye Corporation, New York, N. Y., a corporation of New York No Drawing. Application May 2, 1949,
Serial No. 91,018

9 Claims. (Cl. 260—601)

This invention relates to the manufacture of chlorinated aldehydes and is particularly concerned with the conversion of acetaldehyde or its reversible polymers, e. g. paraldehyde, to polychlorinated acetaldehydes, i. e. dichloracetaldehyde and chloral.

In the past chloral has been manufactured commercially by chlorination of alcohol. This reaction, however, is slow, hazardous and of a highly complex nature requiring careful control and handling to obtain satisfactory yields of chloral. While it has been proposed to prepare chloral as well as dichloracetaldehyde from acetaldehyde by chlorination, yields of the desired products have been so small that the process has never been commercialized. One of the chief difficulties involved in such chlorination is the tendency of acetaldehyde to undergo side reactions of the condensation type as soon as a trace of HCl produced by the reaction is formed, thereby lowering the yield of polychlorinated acetaldehyde product. As is well known, chloral is the organic raw material employed in preparing the important insecticide DDT (p,p'-dichlorodiphenyl - 1,1,1 - trichloroethane). DDT is produced by reacting chloral with chlorobenzene in the presence of sulfuric acid. Dichloracetaldehyde is of use as an intermediate in the production of chloral, and is also employed to prepare the insecticide di(p-chlorophenyl) dichloroethane.

It is an object of the present invention to produce chlorinated acetaldehydes. Another object is the preparation of polychlorinated acetaldehydes, e. g. dichloracetaldehyde and chloral or either of them, in high yields by the chlorination of acetaldehyde or its reversible polymers such as paraldehyde, and chlorinated acetaldehydes, while substantially preventing deleterious side reactions from taking place. A further object of the invention is to provide simple liquid phase processes minimizing explosion hazards and adapted for either batch or continuous operation. A still further object of the invention is to provide a simple procedure by which either dichloracetaldehyde or chloral may be prepared employing essentially the same equipment and effecting only a minor variation in reaction conditions. The invention also aims to produce conversion of dichloracetaldehyde to chloral economically and in good yield. Other objects and advantages of the invention will be apparent from the following detailed description thereof.

In U. S. application Serial No. 91,003 of E. E. Gilbert, filed of even date herewith, a process is disclosed for production in good yields of polychlorinated acetaldehydes by chlorinating acetaldehyde or its reversible polymers in a liquid hydrophilic organic diluent substantially inert to the acetaldehyde starting material and the chlorination products thereof. The diluent in the aforementioned process functions as a reaction and heat dissipating medium inhibiting self-condensation and other side reactions of the acetaldehyde in the presence of HCl which lower the yield of chlorinated product, and permits rapid chlorination at elevated temperatures.

We have discovered that the process of the above Gilbert application is surprisingly improved and unexpectedly higher yields of chlorinated acetaldehyde, particularly of polychlorinated acetaldehyde, may be produced by chlorinating an acetaldehyde or an acetaldehyde containing from 1 to 2 chlorine atoms, in a hydrophilic organic liquid containing water, the liquid being substantially inert to the acetaldehyde starting material and the chlorination products thereof. The hydrophilic organic liquid generally functions as a diluent, the amount of diluent employed being sufficient to substantially prevent deleterious side reactions at the temperature of chlorination. In preferred practice of the invention, the diluent is a solvent comprising one or more chlorinated compounds containing a total of two carbon atoms, one of which constitutes the carbon atom of a carbonyl group, and the amount of water present is not more than 2 mols per mol of carbonyl compounds in the reaction mixture. The use of water in conjunction with the diluent appears to function in some unknown manner to suppress deleterious side reactions more so than in the case where the diluent is employed without water, while at the same time effecting a more rapid rate of chlorination, the net result being more commercially attractive yields of chlorinated product.

Acetaldehyde, $CH_3CHO$, or any of its reversible polymers, e. g. paraldehyde, having the formula $(CH_3CHO)_3$, may be employed separately or in admixture as the preferred organic starting material in our process. Paraldehyde (B. P. 124° C.) is more desirable than acetaldehyde (B. P. 20° C.) in commercial operation since the lower volatility of paraldehyde renders it much less of a fire hazard than acetaldehyde and at the same time occasions less loss of the starting material in handling. It is believed the reversible polymers of acetaldehyde such as paraldehyde depolymerize during chlorination. In any event, to our knowledge paraldehyde and acetaldehyde react substantially in the same manner with chlorine under the hereindescribed conditions to produce the desired polychlorinated acetaldehydes. The expressions "acetaldehydes" or "an acetaldehyde" in the claims is intended to denote either free acetaldehyde or acetaldehyde in the form of its reversible polymers, e. g. paraldehyde. Monochloroacetaldehyde or dichloracetaldehyde may also be employed as starting material with chlorination being carried out until a polychlorinated acetaldehyde having at least one more chlorine atom than the aldehyde starting material is formed. The aldehyde starting material may be added in liquid form all at once or gradually to the reaction mixture. Alternatively, and particularly when acetaldehyde itself is utilized as starting material, the aldehyde may be introduced in vapor phase into the reaction mixture either alone or mixed with an inert gas such as nitrogen or carbon dioxide.

The preferred diluents employed in our process include chlorination products of the aldehyde starting material, e. g. dichloracetaldehyde or chloral or mixtures thereof; mono-, di-, or trichloracetic acid or mixtures thereof; or mixtures of the chlorinated acetic acids with the chlorinated aldehydes. Acetic acid may be used as diluent for the process, but when used, it becomes chlorinated, so that the actual diluent present during the reaction is a mixture of chlorinated acetic acids. The diluent may be recovered from the reaction mixture and used for succeeding charges of reactants. Thus, when acetic acid is used initially, the final diluent may be essentially chlorinated acetic acids, and when mono- or dichloracetic acid is employed initially, the final diluent may be trichloracetic acid, such final diluents being present together with the chlorinated acetaldehydes, e. g. chloral or dichloracetaldehyde or a mixture thereof, resulting from the reaction taking place in the reaction mass. If dichloracetaldehyde is used initially as diluent in making chloral, the final diluent may be substantially its chlorinated derivative, namely, chloral. Other liquid hydrophilic organic diluents which are inert to, and miscible with, the aldehyde starting material and the chlorinated products thereof may also be used. The amount of diluent employed is not critical, the aldehyde starting material, chlorine and water generally being introduced into a relatively large body of the diluent.

Throughout the reaction period the chlorine available for reaction is generally maintained in excess of the theoretical amount required to react with the aldehyde starting material present for obtaining the desired product. In production of dichloracetaldehyde according to the equation,

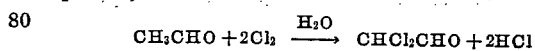

$$CH_3CHO + 2Cl_2 \xrightarrow{H_2O} CHCl_2CHO + 2HCl$$

two mols of chlorine per mol of acetaldehyde are theoretically required as the minimum proportion of chlorine necessary to form the dichloro derivative. In practice of the invention, an excess of chlorine is preferably employed, the total amount of chlorine utilized ranging from more than 2 upwards to as high as and beyond 5 mols per mol of aldehyde, depending upon the efficiency of operation. Ordinarily, from more than 2 up to 4 mols of chlorine per mol of aldehyde are employed. As regards production of chloral in accordance with the equation,

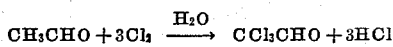

$$CH_3CHO + 3Cl_2 \xrightarrow{H_2O} CCl_3CHO + 3HCl$$

3 mols of chlorine per mol of acetaldehyde are theoretically required as the minimum amount of chlorine. But for the purposes of the invention, an excess of chlorine is preferably likewise applied here, the total amount of chlorine thus utilized ranging from 3 upwards to as high as and beyond 6 mols per mol of aldehyde. Aside from economic considerations there is no critical upper limit of excess chlorine which may be employed. Usually, in accordance with the process, the diluent is first saturated with chlorine prior to introduction of aldehyde, with the chlorine being added gradually to the reaction mixture thereafter. In one satisfactory type of operation, after the diluent is saturated with chlorine, the major portion of the chlorine is generally added along with the aldehyde and water while the remainder of the chlorine is added after all the aldehyde has been introduced, to complete chlorination either to dichloracetaldehyde or to chloral.

Alternatively, either the acetaldehyde starting material, the water, or both may be added gradually along with the chlorine to the diluent or reaction mixture. The most convenient and efficient method of procedure involves gradual introduction of acetaldehyde starting material, all or at least a portion of the water required, and chlorine into the reaction mixture. The latter operating technique not only tends to improve yields, but also lessens explosion hazards.

The term "gradual" or "gradually" as applied to addition or introduction of acetaldehyde starting material, chlorine and water into the reaction mixture during the reaction period is intended herein to denote either intermittent or continuous addition of these reactants.

On completion of chlorination the reaction mixture may be subjected to fractional distillation to isolate the chlorinated aldehyde product from the diluent, e. g. chlorinated acetic acid. If the original diluent is chlorinated acetaldehyde, a portion of the chlorinated material may be withdrawn and the remaining portion used as diluent for a succeeding cycle without resorting to the above distillation operation. Instead of removing the chlorinated acetaldehyde product intermittently or at the end of the chlorination, the product may, of course, if desired, be removed continuously from the reaction mixture.

From the foregoing, it is apparent our process may be carried out in accordance with any of the well known procedural techniques involving either batch or continuous operation, or any combination thereof. Thus, for example, a batch or continuous system may be utilized involving two or more reactors with a portion of the required chlorine being introduced into each reactor and the chlorination of the acetaldehyde starting material taking place in stages in the respective reactors. Further, a partial continuous chlorination of the aldehyde may, if desired, be combined with a batch chlorination of the partially chlorinated aldehyde to facilitate obtaining the desired degree of chlorination.

A preferred embodiment of our invention for producing a polychlorinated acetaldehyde comprises adding acetaldehyde or paraldehyde gradually to a reaction mixture at a temperature between 20° C. and 130° C., the reaction mixture comprising a diluent, dissolved chlorine and water, the diluent being one or more chlorinated compounds containing a total of two carbon atoms, one of which is the carbon atom of a carbonyl group, the amount of water present during the reaction period constituting between 0.1 and 2 mols per mol of carbonyl compounds in the reaction mixture. The chlorine and water concentrations may be maintained by continuous or intermittent addition of these materials along with or alternately with additions of aldehyde. The relative proportions of dichloracetaldehyde and chloral produced are influenced by the ratio of water to carbonyl compounds in the reaction mixture. At the lower limits of water to carbonyl compounds ratio specified, the acetaldehyde or paraldehyde is converted almost entirely to dichloracetaldehyde. At the upper limits specified conversion almost completely to chloral may be effected. Between these limits mixtures of the two chlorinated products are obtained in varying proportions.

It is necessary for the purposes of the invention that water be present in the reaction mixture during chlorination. Although proportions of up to 3 or more mols of water per mol of carbonyl compounds may be employed in accordance with the invention, such large quantities of water tend to bring about deleterious oxidation of halogenated acetaldehydes to halogenated acetic acids. From extensive development work, we have found that the presence of not more than 2, desirably 0.1 to 2, mols of water per mol of carbonyl compounds in the reaction mixture affords the best yields and operating conditions. The expression "carbonyl compounds" has reference both to carbonyl compounds in the form of unchlorinated and chlorinated aldehyde starting material present in the reaction mixture and to the carbonyl compounds (chlorinated acetaldehydes and/or chlorinated acetic acids) acting as diluent in the reaction mixture. The carbonyl compounds present in the reaction mixture may accordingly include both chlorinated acetaldehydes and chlorinated acetic acids when the latter are employed as diluent. However, if dichloracetaldehyde or chloral is employed as diluent and substantially no other carbonyl compounds, e. g. chlorinated acetic acids, are present in the reaction mixture, the quantity of water preferably utilized may be expressed as ranging between 0.1 and 2 mols per mol of aldehydes, including unchlorinated and chlorinated aldehyde reactant and chlorinated aldehyde diluent, present in the reaction mixture. While it is uncertain as to the manner in which the water functions in the reaction, it is our belief that the action of water is catalytic in nature. However, we do not intend that the invention be limited by any theory as to the manner in which the water aids in the reaction.

When it is desired to carry out the process for the production of dichloracetaldehyde, it is preferred to maintain a ratio of between 0.1 and 0.6 mol of water per mol of carbonyl compounds in the reaction mixture, and while satisfactory results may be obtained in the lower portion of this range, we have found better results are ordinarily obtainable when maintaining in the reaction mixture a proportion of 0.4–0.6 mol of water per mol of carbonyl compounds. For example, in one mode of procedure for making dichloracetaldehyde, 0.4 to 0.6 mol of water per mol of diluent (chlorinated acetaldehydes or chlorinated acetic acids) may be dissolved in the anhydrous diluent material and 0.4 to 0.6 mol of water fed into the reaction mixture per mol of aldehyde reactant introduced. Thus, where dichloracetaldehyde or chloral is employed as diluent, and utilizing the above proportions of water, the amount of water in the reaction mixture at all times will be 0.4 to 0.6 mol per mol of total aldehydes present, including acetaldehyde reactant in unchlorinated and chlorinated form, and chlorinated aldehyde diluent. If chlorinated acetic acids are used as diluent and the above conditions with respect to water addition observed, the amount of water in the reaction mixture at all times will be 0.4 to 0.6 mol per mol of total carbonyl compounds present, including unchlorinated and chlorinated acetaldehyde starting material, and chlorinated acetic acids initially employed as diluent.

When it is desired to carry out the process for the production of chloral, maintenance of a ratio of 0.7–1.3 mols of water per mol of carbonyl compounds present in the reaction mixture during a substantial portion of the reaction is preferred, with most desirable results realized within the range of 0.9 to 1.1 mols of water per mol of carbonyl compounds. Although it is not necessary that such quantities of water be present in the reaction mixture at the beginning of the reaction, it is required that these proportions of water be maintained in the reaction mixture at least during the latter portion of the reaction period. Thus, while the ratio of 0.7 to 1.3 mols of water per mol of carbonyl compounds in the reaction mixture may be maintained from the commencement of reaction between the chlorine and acetaldehyde starting material, from 0.1 to 0.6 mol of water per mol of carbonyl compounds may be maintained in the first portion of the reaction until dichloracetaldehyde is produced, and 0.7 to 1.3 mols of water per mol of carbonyl compounds maintained thereafter in the reaction mixture during further chlorination of the dichloracetaldehyde to chloral. Mixtures of dichloracetaldehyde and chloral in varying proportions may be obtained when maintaining in the recation mixture a proportion of water ranging from about 0.5–0.8 mol per mol of carbonyl compounds.

In making chloral using dichloracetaldehyde as diluent, from 0.5 to 1.5 mols of water, for example, may be initially added per mol of anhydrous diluent, and sufficient water introduced with the incoming acetaldehydes and thereafter, if necessary, to give as final chlorination product chloral containing about one mol of water per mol of product corresponding to chloral monohydrate, the chloral being produced by chlorination of the dichloracetaldehyde diluent as well as the acetaldehydes fed to the reaction mixture. If chloral is employed as diluent, about one mol of water per mol of anhydrous diluent may first be added followed by introduction of about one mol of water per mol of incoming acetaldehydes so that the mol ratio of water to total aldehydes, both chlorinated and unchlorinated, in the reaction mixture at all times is about one to one. If a chlorinated acetic acid should be used as diluent in making chloral, about 0.5 mol of water per mol of anhydrous diluent, may first be introduced and additional water added with the acetaldehydes and thereafter, if required, to produce chloral as product, the amount of water maintained at least during the latter portion of the reaction period varying between 0.7 and 1.3 mols per mol of total carbonyl compounds present.

The water introduced into the reaction mixture with the acetaldehyde reactant may be added to the aldehyde or it may be added in vapor form to the chlorine prior to introduction of the aldehyde or chlorine into the diluent. Preferably, however, such water is added separately to the reaction mixture during addition of the other reactants. In calculating the ratio of water to carbonyl compounds or aldehyde herein, such water is intended to include any water of hydration present in the diluents employed, e. g. dichloracetaldehyde or chloral, and one mol of paraldehyde reactant is considered as 3 mols of carbonyl compound or aldehyde.

Temperatures of the reaction mixture for production of polychlorinated acetaldehydes in accordance with the process may vary considerably, but are usually within the range of 20–130° C. In preferred operation, however, temperatures are in the range of 60–90° C., most desirably about 70° C. Use of the preferred comparatively high reaction temperatures in our chlorination process results in shortening reaction time while at the same time bringing about increased yields. Where operations are carried out in the preferred temperature range of 60–90° C., the reaction mixture is generally heated first to provide an initial temperature of reaction of at least 50° C. to thus cause rapid chlorination at the beginning of the reaction. Once the chlorination is under way, the heat of reaction brings about a rapid rise in temperature and usually necessitates cooling of the reaction mixture to maintain the temperature within the preferred limits noted above.

The pressure in the reaction mixture is usually maintained at about atmospheric, although lower or higher pressures are suitable. By using a closed system under superatmospheric pressure, reaction temperatures over 100° C. may be conveniently obtained.

While reaction time is not critical in the instant process, usually from 5 to 15 hours are required for gradual addition of aldehyde, chlorine and water as practiced in the preferred embodiment, with about 1 to 4 hours additional time required for further introduction of chlorine to complete the reaction in making dichloracetaldehyde, while an additional period of about 7 to 15 hours is required for further introduction of chlorine when making chloral. Constant agitation should be maintained in the reaction mixture to prevent local overheating and high concentrations of acetaldehyde reactant. Such agitation may be effected by passing acetaldehyde and/or the chlorine, mixed with an inert gas, e. g. nitrogen or carbon dioxide, into the reaction mixture, the inert gas bubbling through the mixture serving to agitate the latter. The use of an inert gas such as nitrogen or carbon dioxide also tends to minimize explosion hazards. Further, the chlorine may be introduced in the form of a gas near the bottom of the reaction mixture and the HCl liberated in the reaction, in rising through the liquid, may itself provide sufficient agitation to maintain the homogeneity of the mixture. However, mechanical agitation may be employed if desired. Use of packing in a reaction column also gives excellent mixing of the reactants. The instant chlorination process is normally carried out under reflux to permit the evolved HCl and excess chlorine to escape while returning vapors of aldehydes, water and the like to the reaction mixture.

The products dichloracetaldehyde and chloral may be separated from the reaction mixture by distillation. After chlorination is complete the reaction mixture may first be heated under total reflux to expel dissolved chlorine and HCl and the temperature then raised to allow the polychlorinated acetaldehydes to distill off from the mixture. Chloral and dichloracetaldehyde may be separated from the chlorinated acetic acids when the latter are employed as diluent, by distilling off the reaction product at normal pressure up to a temperature of about 100° C., leaving the higher boiling chlorinated acetic acids as still residue which may be reused as diluent in a succeeding chlorination. In the practice of our process it has been found that yields of polychlorinated aldehyde as high as 80–85% based on aldehyde starting material may be obtained.

As an important feature of the invention we have found that dichloracetaldehyde produced in any manner may be readily converted to chloral in accordance with the principles of the process. In practice of this embodiment the dichloracetaldehyde itself may function as diluent or may be mixed with another diluent such as chlorinated acetic acid. The dichloracetaldehyde is then chlorinated to chloral by adding sufficient water to the reaction mixture either before or during introduction of chlorine to furnish up to 2, preferably 0.7 to 1.3 mols of water per mol of carbonyl compounds. When dichloracetaldehyde in the absence of other diluents is chlorinated in the above manner, the amount of water employed may be expressed simply in terms of mols of water per mol of aldehyde. At least one mol of chlorine per mol of dichloracetaldehyde is required for its conversion to chloral, with the temperature of the reaction ordinarily ranging from 20–130° C., preferably from 60–90° C.

The chlorination equipment employed in the instant process may be glass-lined or porcelain-lined. Tantalum may also be used as a construction material.

The following examples are illustrative of the invention, the quantities stated therein being expressed in parts by weight.

*Example 1.*—Into a glass-lined vessel provided with a reflux condenser and suitable inlets for gas, were charged 370 parts of still bottoms from a previous reaction mixture comprising chlorinated acetic acid with about 7 parts water. This mixture was heated to 65° C. and chlorine was admitted until the solution was saturated. Introduction of acetaldehyde and water was then started at a rate such that in 9¼ hours 470 parts of acetaldehyde and 25 parts of water were added. During this same period chlorine was introduced to maintain excess chlorine present in the reactor at all times, the amount introduced in the 9¼ hour period approximating 2570 parts, corresponding to about 3.3 mols of chlorine per mol of acetaldehyde. Addition of water was made in a proportion to maintain a ratio of about .13 mol of water per mol of carbonyl compounds in the reaction mixture. After acetaldehyde addition was complete, the introduction of chlorine was continued for an additional 2 hour period employing about 387 parts of chlorine, or about .50 mol of chlorine per mol of aldehyde. During the entire chlorination the temperature in the reactor was maintained at about 70° C. To accomplish this, it was necessary to heat the charge initially and then to cool it during the introduction of acetaldehyde. After introduction of acetaldehyde was complete, additional heating was required to maintain this temperature. Off gases passing the reflux condenser were conveyed to a water scrubber for removal of HCl and then to a chlorine recovery system. The dichloracetaldehyde product was separated from the reaction mixture by simple distillation at atmospheric pressure. The portion (1064 parts distilling off between 87° and 92° C. was recovered as dichloracetaldehyde product amounting to approximately 83% of the theoretical yield based on acetaldehyde employed. The still bottoms contained a mixture of chloracetic acids which could be reused as solvent in succeeding chlorinations.

*Example 2.*—A reactor was charged with 176 parts of a mixture of chlorinated acetic acids and the charge was heated to about 67° C. and saturated with chlorine. Over a period of about 11 hours, 1445 parts of chlorine, 223 parts acetaldehyde and 44 parts of water were gradually introduced into the reaction mixture. Chlorination was then continued for about 2 hours employing about 155 parts of chlorine. The temperature of the reaction mixture during most of the chlorination period was maintained at about 70° C. Effluent reactor gases consisting essentially of HCl and excess chlorine were recovered in the conventional manner. About 810 parts of final reaction mixture were obtained as product containing dichloracetaldehyde in amount corresponding to a yield of about 71% of theory based on acetaldehyde starting material, and chloral in amount corresponding to a yield of about 16% of theory.

*Example 3.*—433 parts of still bottoms used as diluent in a preceding chlorination and consisting essentially of chlorinated acetic acids containing some water were charged to a glass-lined vessel as employed in Example 1, heated to 65° C. and chlorine and water were introduced slowly into the mixture. When the mixture was saturated with chlorine the introduction of acetaldehyde was started and maintained at such a rate that 450 parts of the acetaldehyde were introduced in about 8 hours, temperature of the reaction mixture being maintained at 70° C. by cooling. During this period 3015 parts of chlorine were introduced to maintain a constant excess of chlorine present in the solution and 164 parts of water were added. The amount of chlorine added in the 8 hour period corresponded to about 4.1 mols per mol of acetaldehyde, with addition of water made in a proportion to maintain a ratio of about 0.7 mol of water per mol of carbonyl compounds in the reaction mixture. After all of the acetaldehyde had been added, the introduction of chlorine was continued for an additional 11½ hours at a rate sufficient to keep the solution nearly saturated. Approximately 1742 parts of chlorine, corresponding to about 2.4 mols of chlorine per mol of aldehyde, were required in addition to that introduced during the flow of acetaldehyde. 50 parts of water, amounting to about 0.2 mol of water per mol of carbonyl compounds, also were added in this period and the temperature of the charge was raised gradually to 80° C. During chlorination HCl and excess chlorine were removed under reflux and recovered. At the end of the reaction period residual chlorine was expelled under reflux and the mixture was subjected to fractional distillation, the portion distilling off between 85° and 100° C. being collected as chloral. Approximately 1235 parts parts of chloral corresponding to 67% of the theoretical yield based on acetaldehyde employed were obtained. The distillation residue which consisted primarily of chlorinated acetic acids could be used again for successive batches.

*Example 4.*—176 parts of glacial acetic acid were charged to a reactor and the charge was heated to about 70° C. and saturated with chlorine. A mixture of acetaldehyde vapor and nitrogen was then added to the reaction mixture along with chlorine and water, while maintaining the temperature of the charge at between 70 and 80° C. In 6¾ hours, about 180 parts of acetaldehyde, 1040 parts of chlorine and 72 parts of water were charged into the reaction. Chlorination was then continued for about 12 hours employing 1080 parts of chlorine, during which time 20 parts more of water were also added. In the latter 12 hour period of chlorination, the temperature was gradually increased from 80 to 97° C. 750 parts of reaction product were obtained containing chloral in amount corresponding to a yield of about 60% based on aldehyde starting material.

*Example 5.*—244 parts of dichloracetaldehyde hemihydrate as diluent were charged to a reaction vessel, heated to 50° C. and saturated with chlorine. Paraldehyde, chlorine and water were then fed simultaneously and gradually to the reaction vessel resulting in a gradual temperature rise of the reaction mixture to 70° C., at which point the temperature was maintained by cooling. The reactants were introduced into the reaction mixture in a proportion of 27 parts paraldehyde, 93 parts chlorine and 6 parts of water. The crude dichloracetaldehyde reaction product formed was continuously drawn off from the reaction vessel at a rate of 73 parts per hour, giving 991 parts of the crude product containing about 750 parts dichloracetaldehyde in 13.5 hours. Residual chlorine and HCl were expelled under reflux and conveyed to a water scrubber to remove HCl and then to a chlorine recovery system.

Into the 991 parts of crude dichloracetaldehyde reaction mixture obtained above were charged 81 additional parts of water and the resulting mixture was heated to about 80° C. 564 parts of chlorine were then introduced into the mixture for about 13½ hours, the reaction proceeding under reflux with HCl and excess chlorine carried off and recovered. At the end of the reaction period the reaction mixture was subjected to fractional distillation, the portion distilling off between 90° and 100° C. being collected as chloral. About 1142 parts of chloral corresponding to almost 81% of the theoretical yield based on paraldehyde were obtained.

*Example 6.*—To 138 parts of a mixture comprising essentially chlorinated acetic acids and dichloracetaldehyde were added about 25 parts of water corresponding to a ratio of about 0.8 mol of water per mol of carbonyl compounds present. Over a period of about 10½ hours approximately 230 parts of chlorine were introduced gradually into the reaction mixture. The temperature of reaction ranged from about 75 to 100° C. during most of the reaction period. Distillation of a portion of the reaction mixture indicated production of a high yield of chloral.

Since various changes and modifications may be made in the invention without departing from the spirit thereof, the invention is to be taken as limited only by the scope of the appended claims.

We claim:

1. The process for producing a polychlorinated acetaldehyde which comprises: adding chlorine, water and an acetaldehyde gradually to a chlorine-saturated liquid hydrophilic organic diluent maintained at 20–130° C., said diluent being substantially inert to said aldehyde and the chlorination products thereof and comprising at least one chlorinated organic compound having a total of two carbon atoms, one of which is the carbon atom of a carbonyl group; regulating addition of chlorine and aldehyde reactants and water to establish and maintain in the reaction mixture initially and throughout the reaction period water in the proportion of at least 0.1 mol and not more than 3 mols per mol of carbonyl compounds in the reaction mixture and chlorine available for reaction in excess of the theoretical amount required to convert acetaldehyde starting material present into polychlorinated acetaldehyde; and carrying out the chlorination until a polychlorinated acetaldehyde is formed.

2. The process as defined in claim 1 wherein the initial temperature of the reaction is at least 50° C.

3. The process as defined in claim 1 wherein the diluent comprises a chlorinated acetic acid.

4. The process of producing dichloroacetaldehyde which comprises: adding chlorine, water and an acetaldehyde gradually in a period of about 5–15 hours to a chlorine-saturated liquid hydrophilic organic diluent maintained at 20°–130° C., said diluent being substantially inert to said aldehyde and the chlorination products thereof and comprising at least one chlorinated compound having a total of two carbon atoms, one of which is the carbon atom of a carbonyl group; regulating addition of water and aldehyde reactant to establish and maintain in the reaction mixture initially and throughout the reaction period water in the proportion of at least 0.1 mol and not more than 3 mols per mol of carbonyl compounds in the reaction mixture; introducing chlorine to the reaction mixture in a ratio of more than two and up to 5 mols per mol of aldehyde being introduced; thereafter continuing addition of chlorine for 1–4 hours; and recovering dichloroacetaldehyde as product.

5. The process as defined in claim 2 wherein temperature of said diluent is maintained at 60°–90° C.

6. The process of producing chloral which comprises: adding chlorine, water and an acetaldehyde gradually in a period of about 5–15 hours to a chlorine-saturated liquid hydrophilic organic diluent maintained at 20°–130° C., said diluent being substantially inert to said aldehyde and the chlorination products thereof and comprising at least one chlorinated compound containing a total of two carbon atoms, one of which is the carbon atom of a carbonyl group; introducing the chlorine in a ratio of 3–6 mols per mol of aldehyde fed; regulating addition of aldehyde reactant and water to establish and maintain in the reaction mixture initially and throughout the reaction period water in the proportion of at least 0.7 mol and not more than 3 mols per mol of carbonyl compounds in the reaction mixture; thereafter continuing addition of chlorine for 7–15 hours and recovering chloral as product.

7. The process as defined in claim 4 wherein the diluent is maintained at 60°–90° C.

8. The process for producing chloral which comprises: as a first chlorination stage adding chlorine, water and an acetaldehyde gradually over a period of 5–15 hours to a chlorine-saturated liquid hydrophilic organic diluent maintained at 60°–90° C., said diluent being substantially inert to said aldehyde and the chlorination products thereof and comprising at least one chlorinated compound having a total of two carbon atoms, one of which is the carbon atom of a carbonyl group; regulating addition of chlorine and aldehyde reactants and water to establish and maintain in the reaction mixture initially and throughout the first chlorination stage water in the proportion of at least 0.1 mol per mol and not more than 3 mols of carbonyl compounds in the reaction mixture and chlorine available for reaction in excess of the theoretical amount required to convert the acetaldehyde starting material present into dichloroacetaldehyde; and as a second chlorination stage adding sufficient water to the first stage reaction product to establish and maintain therein water content of at least 0.7 mol and not more than 3 mols per mol of carbonyl compounds present, continuing addition of chlorine for 7–15 hours, and recovering chloral as product.

9. The process for producing a polychlorinated acetaldehyde which comprises: adding chlorine, water and ana ldehyde of the group consisting of acetaldehydes and acetaldehydes containing from 1–2 chlorine atoms gradually to a chlorine-saturated liquid hydrophilic organic diluent maintained at 20°–130° C., said diluent being substantially inert to said aldehydes and the chlorination products thereof and comprising at least one chlorinated organic compound having a total of two carbon atoms, one of which is the carbon atom of a carbonyl group; regulating addition of chlorine and aldehyde reactants and water to establish and maintain in the reaction mixture initially and throughout the reaction period water in the proportion of at least 0.1 mol and not more than 3 mols per mol of carbonyl compounds in the reaction mixture and chlorine available for reaction in excess of the theoretical amount required to convert said aldehyde starting material present into a polychlorinated acetaldehyde having at least one more chlorine atom than the aldehyde starting material; and carrying out the chlorination until there is formed a polychlorinated acetaldehyde having at least one more chlorine atom than the aldehyde starting material.

References Cited in the file of this patent

UNITED STATES PATENTS

| Number | Name | Date |
|---|---|---|
| 2,478,152 | Cass | Aug. 2, 1949 |
| 2,478,741 | Brothman | Aug. 9, 1949 |
| 2,552,934 | Cave et al. | May 15, 1951 |
| 2,606,864 | Cave et al. | Aug. 12, 1952 |
| 2,615,048 | Pianfetti et al. | Oct. 21, 1952 |
| 2,615,049 | Pianfetti et al. | Oct. 21, 1952 |

OTHER REFERENCES

Wurtz et al.: Comptes Rend., vol. 74, pp 777 to 784 (1872).

Pinner: Ann., vol. 179–180, pages 24 and 25 (1875).

Schulz: P. B. Report 70309, Frame 8241, released by Office of Technical Services, July 18, 1947.

Shchukina: Chemical Abstracts, April 1949, vol. 39, page 2575c. Abstract of an article in Zhur. Obshchei Khim. (Journal of General Chemistry (Russian), vol. 18, pages 1653–62 (1948).